June 9, 1931.  A. S. FITZ GERALD  1,809,683
FREQUENCY RESPONSIVE APPARATUS
Filed Oct. 4, 1928
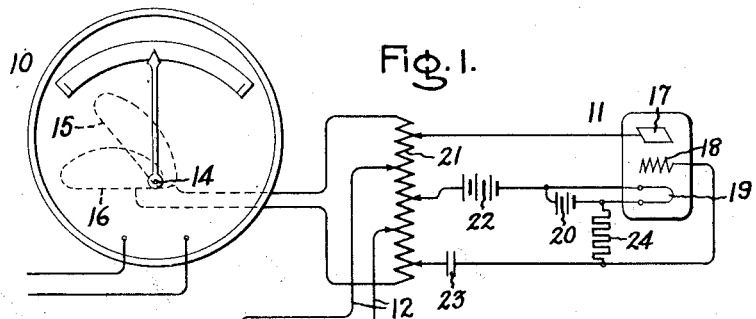
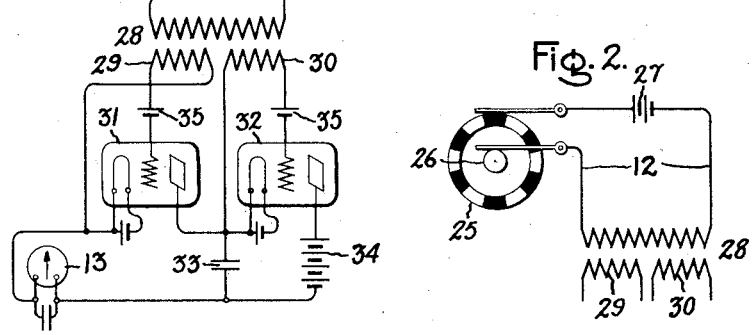
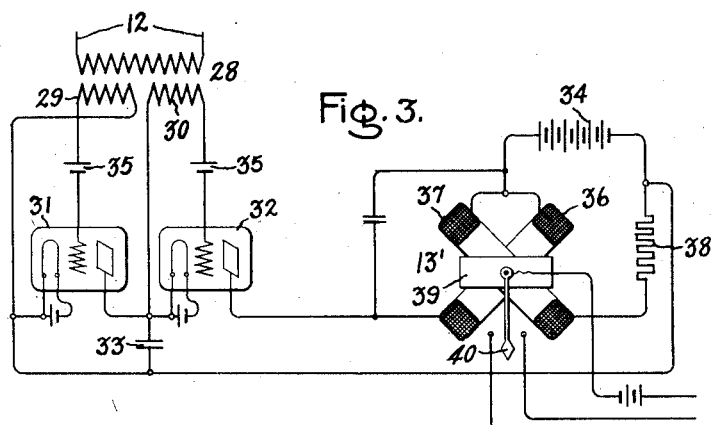
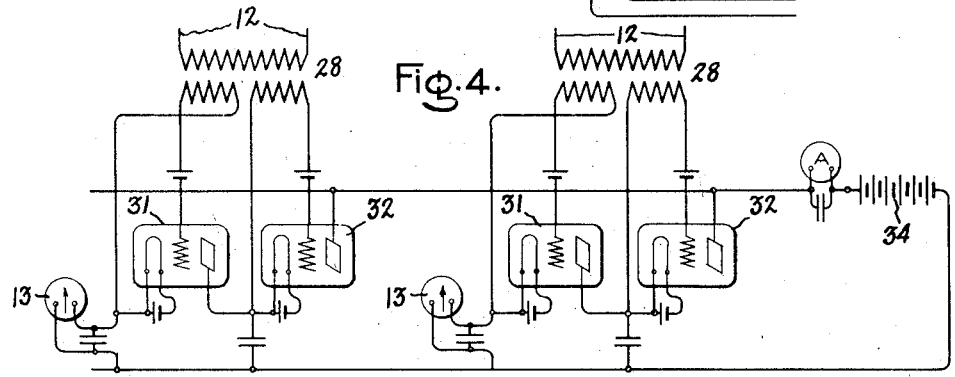
Inventor:
Alan. S. FitzGerald,
by Charles E. Tullar
His Attorney Patented June 9, 1931

1,809,683

UNITED STATES PATENT OFFICE

ALAN S. FITZ GERALD, OF SCHENECTADY, NEW YORK, ASSIGNOR TO GENERAL ELECTRIC COMPANY, A CORPORATION OF NEW YORK

FREQUENCY RESPONSIVE APPARATUS

Application filed October 4, 1928. Serial No. 310,397.

My invention relates to frequency responsive apparatus, particularly suitable for use as a telemetering receiver, capable of producing in a simple and reliable manner an indication proportional to the frequency of interrupted direct current or of alternating current. Such signaling frequencies may be produced by any suitable apparatus at the transmitting end of the telemetering system and may be proportional to the deflection of one or more indicating instruments or to the speed of rotation of one or more integrating meters and the receiving apparatus of my invention may be used to produce a summation indication proportional to signaling frequencies transmitted over different lines of any length from different transmitters simultaneously.

It has heretofore been proposed to provide a telemetering receiver in which a mechanical relay responsive to the transmitted current impulses alternately charges and discharges a condenser from a constant voltage source and to measure the current of the condenser to obtain a deflection proportional to the frequency of such impulses. Such a receiver is shown for example in German Patent 304,091.

Such a receiver has certain limitations, for example the deflection is subject to errors occasioned by chattering contacts and changes in the contact resistance due to wear, burning, etc. Also the use of a mechanical relay is limited by its inability to function properly in response to feeble impulses and pulsations of as high a frequency as it is oftentimes desired to use in telemetering systems.

In accordance with my invention I employ valves of the vacuum tube type, for charging and discharging the condenser of the receiving apparatus and in this way mechanical contacts and the limitations incident thereto are avoided.

The features of my invention which are believed to be novel and patentable will be pointed out in the claims appended thereto. For a better understanding of the invention reference is made in the following description to the accompanying drawings in which Fig. 1 represents a complete telemetering system employing my improved receiver; Fig. 2 represents an alternative method of producing interrupted direct current frequencies suitable for use with an integrating meter; Fig. 3 represents the receiving apparatus in which a differential measuring instrument is employed to eliminate errors due to varying in voltage of the local source used for charging the condenser; and Fig. 4 represents the invention as employed in one form as a summation receiver.

Referring to Fig. 1, I have represented a complete telemetering system for reproducing an instrument deflection at a distant point. In this case the signaling frequency is produced at the transmitting end by a vacuum tube oscillator controlled by a variable condenser operated by the transmitting instruments. In Fig. 1, 10 indicates the transmitting instrument, 11 the oscillation generator, 12 the transmitting lines, and 13 the receiving instrument.

The transmitting instrument is here represented as an indicating type electric measuring instrument such as a voltmeter although it could be any other movable device, the position or indication of which it is desired to indicate at a distant point. On the shaft 14 of the instrument is one plate 15 of a variable condenser. The stationary plate of the condenser is indicated at 16. The variable condenser may be placed below the coils of the instrument and requires but a small space. It will be evident that as the instrument deflection increases, the movable plate will be displaced with respect to the stationary plate and the capacity will be decreased. As represented, the condenser will have a minimum capacity when the instrument deflection is a maximum; however, one is not limited to this arrangement. It will also be evident that the extra torque necessary for the movement of the condenser plate 15 will be very small and ordinarily will not interfere with the accuracy of the instrument.

There is a small instrument torque necessary to separate the condenser plates due to the mutual attraction between them. However, if this is sufficient to change the calibration of the instrument, it can be taken care of in a very simple and accurate manner by readjusting the seating of the usual control spring which is provided to oppose the instrument deflection. The counter torque of the control spring and the counter torque of the condenser plate are in the same direction when the condenser plates have their maximum capacity relation at zero deflection as illustrated. This is the preferable arrangement where the instrument 10 is of the usual type, because by such arrangement, the extra torque imposed by the mutual attraction of the condenser plates can then be accurately and simply compensated for, if that is necessary, by a slight alteration of the setting of the control spring. As an alterative, the scale of the instrument could be calibrated with the variable condenser in operative condition.

The oscillator 11 and its associated circuit is only one of a number of standard hook-ups that might be used and comprises the vacuum tube containing the plate 17, the grid 18 and the filament 19, a battery 20 for heating the filament, an inductance coil 21, and a source of direct current potential 22 connected between the filament and an intermediate point on the inductance coil. The grid 18 and the plate 17 are connected adjacent the opposite ends of the inductance coil. The condenser 23 connected in the same grid circuit and the resistance 24 connected between the filament and the grid outside the tube are arranged in the usual way. It is known that such a device may be used as a generator of alternating currents and that if the constants of its circuit are varied the frequency which it generates will vary. Thus the variable condenser 15, 16 is connected across the terminals of the coil 21 and by varying the capacity in this circuit, the frequency of the alternating current produced by the device will vary. According to the hook-up illustrated, a decrease in the capacity will cause the generated frequency to increase. The outgoing transmitting circuit 12 is supplied by this oscillator, the circuit being connected across the central portion of the coil 21 and it will be evident that an alternating current having a frequency dependent upon the indication of instrument 10 will be fed to circuit 12.

Where an integrating meter is employed at the sending station the signaling frequency may be produced by a contact device such as is shown in Fig. 2 where the commutator 25 is driven from the meter shaft 26 and the signaling frequency produced by the interruption of a direct current source 27.

At the receiving end there is provided a transformer 28 energized from the transmitting lines 12 and having two secondary windings 29 and 30. These two secondary windings are reversely connected to control the grids of vacuum tubes or thermionic valves 31 and 32 in such a manner that the tubes alternately pass current to charge and discharge the condenser shown at 33 from a direct current source 34 in accordance with the alternating direction of potential in the secondary windings of the transformer. It will be evident that the potential induced in the secondary windings 29 and 30 will be an alternating current potential regardless of whether the primary is energized by alternating current or by interrupted direct current. The charge or discharge current of the condenser or both is measured by an electric measuring instrument. In Fig. 1 the discharge current is measured by the direct current instrument 13 and preferably a small condenser is shunted across the instrument terminals to smooth out the pulsating direct current in the instrument circuit. To obtain a correct indication the current in the instrument circuit must be proportional to the frequency impressed upon the primary of transformer 28 and independent of the strength of the signaling current or independent of wide variations in voltage across the transformer primary.

Connected between the transformer secondaries and the grids of the tubes 31 and 32 are batteries 35 which normally produce a negative grid bias. Now it will be seen that when the transformer is excited with an alternating current or with interrupted direct current the grids of the two tubes will alternate in polarity; that is the grid of tube 32 will be positive when the grid of tube 31 is negative, and vice versa. During a half cycle when the grid of 32 is positive it will pass current from the source 34 to charge the condenser 33. At this time there will be no current through tube 31 because its grid is negative. The charging of condenser 33 will cease when it becomes charged to the potential determined by the source 34 which in this case should be maintained constant. During the other half cycle the grid of 31 becomes positive and that of 32 negative and tube 31 will pass the discharge current of the condenser 33 through the instrument 13. If the capacity of the condenser 33 is small as compared with the current carrying capacity of the tubes it will be charged and discharged almost instantly; that is to say, the condenser will be fully charged and discharged with a very high signaling frequency as well as with a low signaling frequency.

It is seen therefore that during each cycle of alternating current voltage or during each complete direct current signaling pulsation impressed upon the primary of transformer 28 the condenser will be charged to a definite potential and will then discharge a definite amount of current through instrument 13 and that the magnitude of this current will be independent of the alternating current voltage induced into the secondary windings 29 and 30 provided it is sufficient to properly bias the grids. The amount of current flowing to instrument 13 will therefore be directly proportional to the signaling frequency. The small condenser shown connected across the terminals of instrument 13 assists in smoothing out the current pulsations passing through the instrument and if the instrument is properly damped, the frequency of such pulsations may be varied over a very wide range with accurate results; for example from a few cycles to over 1000 cycles per second.

The receiver shown in Fig. 3 is similar to that of Fig. 1 with the exception of the connections and construction of the measuring instrument. A differential measuring instrument 13′ is represented in Fig. 3, coil 36 of which is connected in the charging circuit of condenser 33 and coil 37 of which is connected across the source 34. Preferably a current limiting resistance 38 is contained in the circuit of coil 37.

The purpose of this arrangement is to make the receiver independent of voltage variations in the source 34 so that an ordinary 110 volt direct current source may be utilized if desired. This result is accomplished by reason of the fact that variations in voltage of source 34 will influence both coils equally. When no signals are coming in, coil 37 will turn the armature 39 so that the pointer 40 is deflected to a zero position towards the right. When signals are coming in, the armature will be jointly influenced by both coils and the pointer will swing to the left a distance proportional to the signaling frequency. As represented in Fig. 3, contacts may be provided on the current responsive device to enable it to serve the purpose of a relay.

In Fig. 4 two incoming telemetering lines 12 are represented and two complete receivers are represented, both receiving their energy from the same source 34. A totalizing instrument A is connected in the condenser charging circuit of both receivers and consequently this instrument will correspond to the sum of the readings or integrations of distant transmitting instruments which separably transmit signals over the different circuits 12, while the instruments 13 located in the discharge circuits will correspond to the individual readings or integrations of such distant transmitting instruments. It will be obvious that any number of such receivers may be combined to obtain a totalizing indication.

It will be observed that the receiver takes no energy from the lines 12 and that the receiving apparatus employing sensitive tubes, as it does, will respond to very feeble as well as to strong signal frequencies. Consequently the device makes it possible to accurately reproduce all kinds of indications or movements with weak signal frequencies transmitted over long distances without trouble due to variations in resistance of the transmitting circuits. The device being responsive to frequency is likewise suitable for measuring and comparing frequencies and for energizing relays, synchronoscopes, and the like, in response to frequence through controlling circuits which need pass no energy, such for example as condenser bushings.

In accordance with the provisions of the patent statutes I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:

1. Frequency responsive apparatus for producing an indication proportional to the frequency of electric signaling currents comprising a source of direct current, a condenser, means including a thermionic valve for charging said condenser from said source, means including a second thermionic valve for discharging said condenser, the condenser thus having charging and discharging currents, a measuring instrument for measuring one of such condenser currents, and means responsive to signaling currents for alternately controlling said valves to alternately charge and discharge said condenser at a rate proportional to the signaling frequency.

2. Frequency responsive apparatus comprising a pair of grid controlled thermonic valves, means for normally negatively biasing the valves so that no current flows therethrough, a direct current source, a condenser, a charging circuit from said source to said condenser through one of said valves, a discharging circuit for said condenser through the other of said valves, a transformer having primary and secondary windings with the latter connected to produce biasing voltages of opposite polarity upon the grids of said thermionic valves whereby one valve passes current to charge said condenser and the other valve passes current to discharge said condenser in an alternating sequence when signaling frequency currents are impressed upon the primary of said transformer, and current responsive means influenced by one of such condenser currents.

3. A frequency responsive device comprising a direct current source, a condenser, a circuit including a thermionic valve for charging said condenser from said source, a circuit for discharging said condenser including a second thermionic valve, a measuring instrument included in one of said circuits, a second condenser connected in shunt to said instrument, voltage biasing means for normally rendering said valves non-conducting, and other voltage biasing means responsive to signaling frequencies for alternately annulling the first mentioned biasing means and causing said valves to pass current to alternately charge and discharge the first mentioned condenser at a rate proportional to the signaling frequency.

4. Frequency responsive apparatus comprising two electron discharge devices having grids for controlling the passage of current therethrough, a condenser, a source of direct current potential, circuit connections for charging said condenser from said source through one of said devices, circuit connections for discharging said condenser through the other of said devices, current responsive means influenced by the current flowing in one of said circuits, and means responsive to signaling frequency currents for alternately biasing the grids of said devices to permit said devices to alternately pass current.

5. Frequency responsive apparatus comprising a source of direct current potential, a condenser, a circuit for charging said condenser from said source including a thermionic valve, a circuit for discharging said condenser including another thermionic valve, said valves being normally biased to a non-conducting condition, means responsive to signaling frequency currents for alternately biasing said valves to a conducting condition, and current responsive means included in one of said circuits.

In witness whereof, I have hereunto set my hand this 3rd day of October, 1928.

ALAN S. FITZ GERALD.